United States Patent [19]

Ookuwa et al.

[11] Patent Number: 5,715,614

[45] Date of Patent: Feb. 10, 1998

[54] TRANSPLANT APPARATUS

[75] Inventors: Masaaki Ookuwa, Yokohama; Takanori Fujiwara, Hachiouji, both of Japan

[73] Assignee: Kabushiki Kaisha Ishikatsu Exterior, Inc., Tokyo, Japan

[21] Appl. No.: 634,915

[22] Filed: Apr. 19, 1996

[30] Foreign Application Priority Data

Apr. 25, 1995 [JP] Japan ................. 7-101025
Apr. 2, 1996 [JP] Japan ................. 8-080091

[51] Int. Cl.⁶ ........................................ A01G 23/06
[52] U.S. Cl. ........................... 37/302; 37/409; 37/461; 172/689; 414/23
[58] Field of Search ............... 37/301, 302, 406, 37/409, 410, 461, 184, 185; 111/100, 101, 104; 172/689, 690, 691; 414/23

[56] References Cited

U.S. PATENT DOCUMENTS

| 2,990,630 | 7/1961 | Crawford | 37/302 X |
|---|---|---|---|
| 3,191,982 | 6/1965 | Goalard | 37/302 X |
| 3,558,177 | 1/1971 | Snead | 37/302 X |
| 4,047,313 | 9/1977 | Bricon | 37/406 X |
| 4,088,163 | 5/1978 | Levesque | 37/302 X |
| 4,351,253 | 9/1982 | Dahlquist | 37/302 X |
| 4,481,989 | 11/1984 | Peters | 37/302 X |

FOREIGN PATENT DOCUMENTS

| 2902597 | 7/1980 | Germany | 37/302 |
|---|---|---|---|
| 3617673 | 12/1987 | Germany | 37/406 |
| 360175633 | 9/1985 | Japan | 37/406 |
| 360175634 | 9/1985 | Japan | 37/406 |
| 250574 A | 8/1969 | U.S.S.R. | 37/302 |
| 1477328 | 5/1989 | U.S.S.R. | 37/302 |

*Primary Examiner*—Randolph A. Reese
*Assistant Examiner*—Victor Batson
*Attorney, Agent, or Firm*—John R. Benefiel

[57] ABSTRACT

A transplant machine including a bucket for digging a plant such as trees and shrubs from the ground, a main frame for pivotably supporting the bucket, an arm for lifting the main frame, a shaft extending from the main frame at right angles and an intermediate frame for connecting the main frame with the lifting arm such that the frame can rotate about the shaft relative to the lifting arm. The frame and the bucket rotate together. As the main frame rotates about the shaft, the bucket rotate with the main frame. Therefore, the transplant machine can change a direction of the a tree after a digging operation. In other words, it is possible to turn the tree while the bucket is holding the tree above the ground. During the turning of the tree, the lifting arm (or a main body of the transplant apparatus) is stopped since the intermediate frame allows the main frame and the bucket to rotate relative to the lifting arm. The bucket may be removable from the lifting arm. After digging the tree, the bucket which is holding the tree may be detached from the lifting arm and placed on a truck for long distance transportation. The main body of the transplant machine stays at the digging place and only the bucket and the tree are carried by the truck.

22 Claims, 13 Drawing Sheets

TRANSPLANT APPARATUS

BACKGROUND OF THE INVENTION

Technical Field

The present invention relates to an apparatus for transplanting trees and shrubs from one place to another for construction of parks and golf courses, development of mountains and forests and the like.

Background Art

Various transplant apparatuses for trees and shrubs are known in the art. For instance, Japanese Patent Application, Laid-Open Publication Nos. 60-137215 and 62-25923 disclose such transplant apparatuses. JP 60-137215 will be discussed below referring to FIGS. 20 and 21 of the accompanying drawings.

As illustrated in FIG. 20 which shows a left side view of a conventional tree transplant apparatus, the apparatus includes a crawler unit 10 having a pair of right and left lift arms 12 (the left arm is only shown). These arms 12 are moved up and down by associated cylinders 14 respectively. A left connection member 16 is pivotably mounted on the left arm 12 at its one end thereof and on a left tilt arm 18 at the other end. The same can be said to the right side of the apparatus. The left and right tilt arms 18 are moved forward and backward upon extension and retraction of associated cylinders 20.

The arms 12 and 18 support in combination a dig unit 22 at their front ends. The dig unit 22 includes a frame 24 for pivotably connecting the arms 12 and 18 with a main part of the dig unit 22 and a pair of right and left buckets 26 adapted to swing in a width direction of the frame 24 so as to dig a tree from ground and hold the tree like a man's two hands. The frame 24 and the buckets 26 are coupled with each other by a link mechanism 28 and a pair of cylinders 30. The dig unit 22 is lifted up and down by the cylinders 14, and its inclination or posture is determined by the tilt cylinders 20.

Referring now to FIG. 21 which depicts a fragmentary front view of the transplant machine shown in FIG. 21, a digging operation for a tree 32 will be described. First, the ground around a root portion 34 of the tree 32 is excavated by hand with a suitable tool to form a groove or channel 36. Then, the buckets 26 are lowered into the channel 36 and rotated inward respectively in an approaching direction such that they creep or crawl under the root 32 of the tree 32. After that, the entire dig unit 22 is moved up while the buckets 26 are being maintained in position, thereby lifting the tree 32 from the ground. Then, the traveling unit 10 carries the tree 32 to a desired place with the tree 32 being maintained at a certain height from the ground.

This conventional transplant machine generally functions satisfactorily. However, it has a drawback when the tree 32 should change its direction upon being transplanted in a designated place. Specifically, the prior transplant machine is not convenient if the tree should rotate about its longitudinal direction when transplanted. Generally the tree grows from a seeded position so that one particular face of the tree has been directed to the south and the opposite face to the north from the beginning. In order to ensure appropriate development of the tree after transplantation, that face of the tree which has been directed to the south before transplantation should also be directed to the south after transplantation. However, a direction in which the transplant machine is allowed to approach the tree is limited by various reasons such as surrounding trees and bushes or any other structures. Likewise, a direction in which the transplant machine is able to proceed to arrive at the desired transplantation site is also limited for similar reasons. Usually, in consideration of appropriate movements of various arms and links of the transplant machine as well as safety of the machine, operators, labors and neighboring structures, the transplant machine takes a route which provides a sufficiently large space. In such a case, the tree should be unloaded from the transplant machine by a crane or the like and turned to a certain degree before transplanted to a desired place or the tree should be unloaded onto the ground from the transplant machine, rotated by hand and carried or pushed to a desired position. This is troublesome.

The crawler-type traveling unit is employed to move on sloping terrain or unpaved roads since the transplanting machine should be able to work on such a non flat and rough surface. However, the crawler traveling unit is not suited for long distance transportation. Particularly, it is not possible to drive the transplant machine having the crawler traveling unit on a highway for any distance.

Also, the conventional transplant apparatus should carry the tree by itself to a transplant site from a digging place. Therefore, another digging operation cannot be carried out until a series of digging, transferring and transplanting operations for one tree is completed. This is inefficient.

SUMMARY OF THE INVENTION

One object of the present invention to provide a transplant apparatus which can easily turn a tree prior to unloading of the tree in a relatively small space.

Another object of the present invention is to provide a transplant apparatus which improves serviceability.

Still another object of the present invention is to provide a transplant apparatus which can dig a tree in an optimal direction.

Yet another object of the present invention is to provide the transplant apparatus which can reduce a time required for transplantation.

Another object of the present invention is to provide a transplant apparatus which can easily load the tree onto a carrier vehicle so that transportation of the tree to a distant place becomes feasible with less labor.

Another object of the present invention is to provide a transplant apparatus which can dig another tree while a tree just dug is being transferred to another site.

According to one aspect of the present invention, there is provided an apparatus for transplanting a plant such as trees and shrubs from one place to another comprising a bucket for digging the plant from the ground, a frame for pivotably supporting the bucket, an arm for lifting the frame, a first shaft extending from the frame at right angles and means for connecting the frame with the lifting arm such that the frame can rotate about the first shaft and relative to the lifting arm. The frame and the bucket rotate together. As the frame rotates about the first shaft, the bucket rotates with the frame. Therefore, the transplant apparatus can change by itself the direction of the plant (e.g., a tree) after a digging operation. In other words, it is possible to turn the tree while the bucket is holding the tree above the ground. During the turning of the tree, the lifting arm (or a main body of the transplant apparatus) is stopped since the connection means allows the frame and the bucket to rotate relative to the lifting arm.

The transplant apparatus may further include means for separating the bucket from the lifting arm. After digging the tree, the bucket which is holding the tree may be detached from the lifting arm and placed on a truck for long distance transportation. The main body of the transplant apparatus stays at the digging place and only the bucket and the tree are carried by the truck. Meantime, another bucket is attached to the transplant apparatus so that it is possible to dig another tree during transportation of a just dug tree.

These and other objects and advantages of the present invention will become more apparent from the following detailed description and the appended claims as taken in conjunction with the accompanying drawings.

BRIEF DESCRIPTION OF THE ACCOMPANYING DRAWINGS

DETAILED DESCRIPTION OF THE PREFERRED EMBODIMENTS

Now, preferred embodiments according to the present invention will be described with reference to FIGS. 1 to 19 of the accompanying diagrams.

FIRST EMBODIMENT

Figure 1:
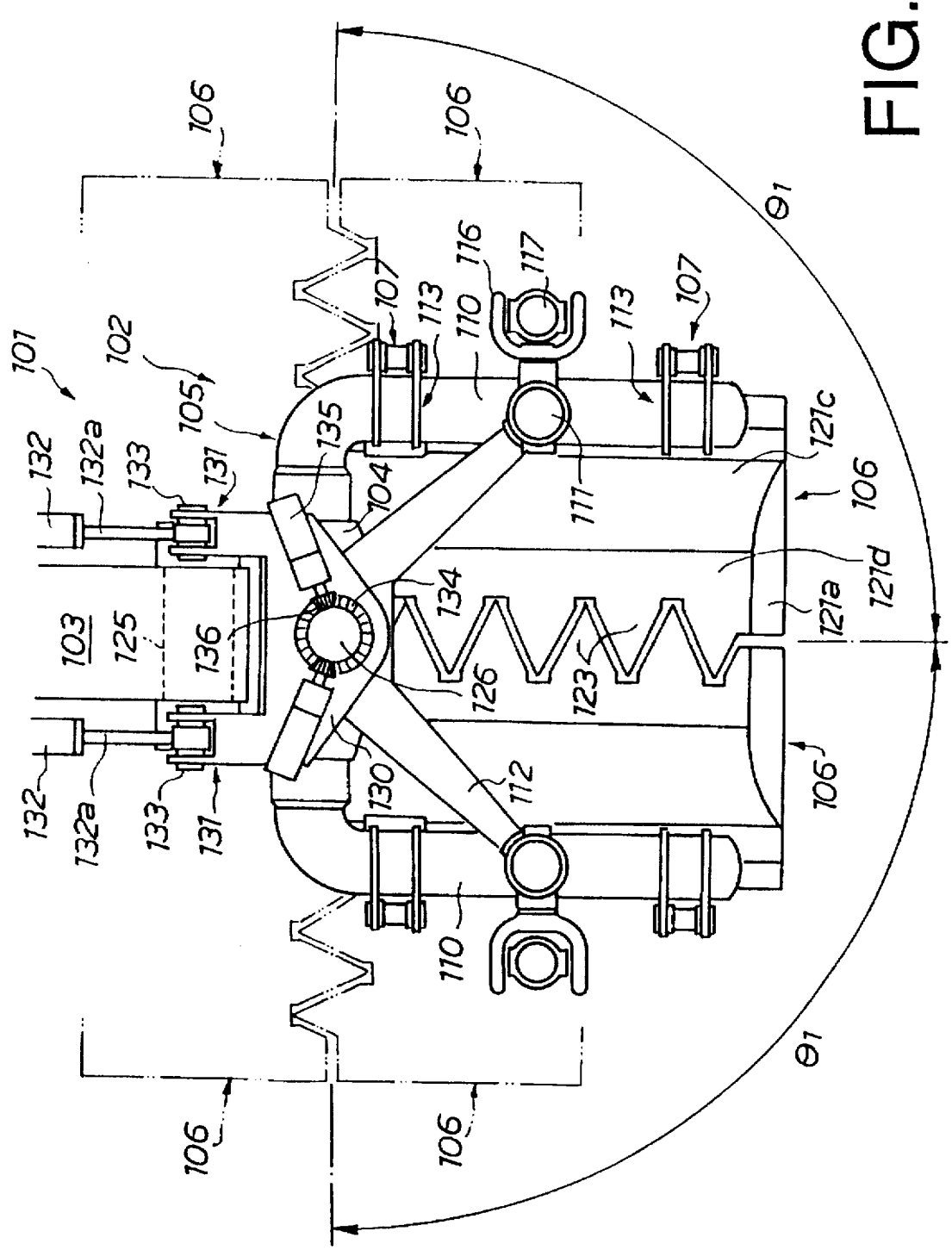
FIG. 1 is a plan view of part of a transplant apparatus according to one embodiment of the present invention when buckets are closed.
Figure 20:
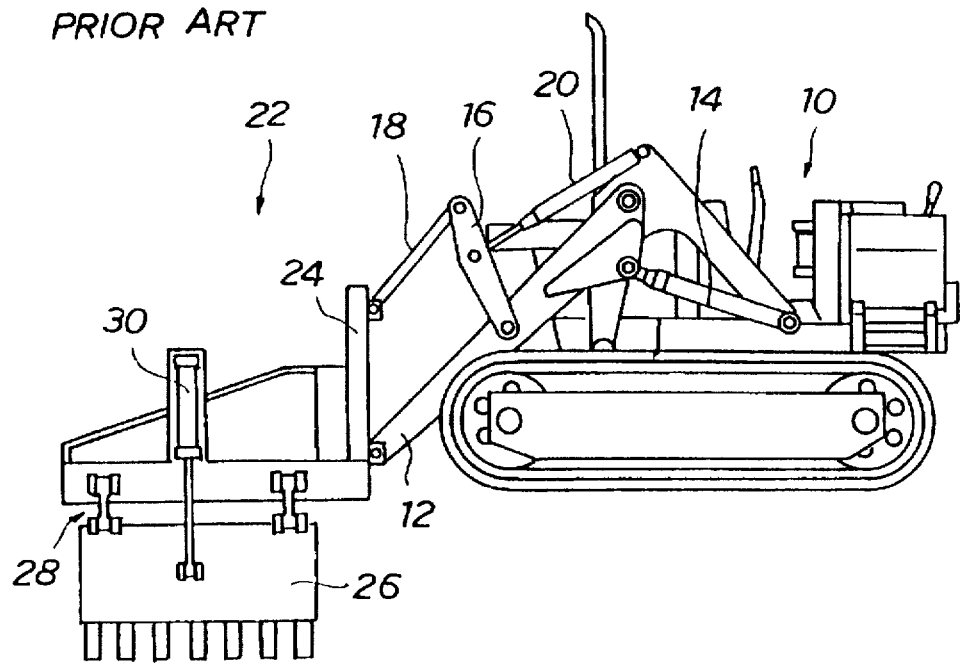
FIG. 20 depicts a left side view of a prior transplant apparatus.
Figure 21:
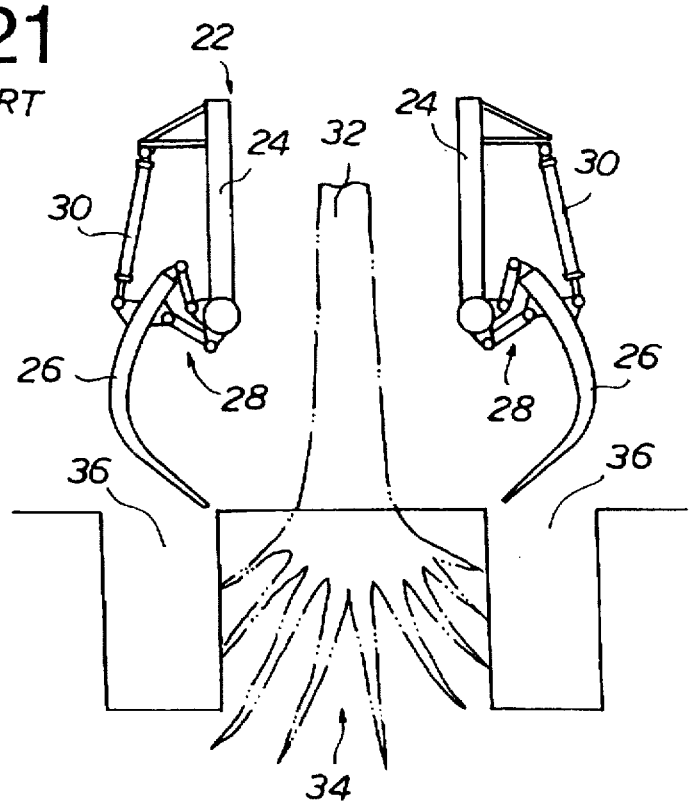
FIG. 21 depicts a schematic front view of the transplant apparatus shown in FIG. 20 showing a digging operation.

Referring to FIG. 1, a transplant apparatus 101 of the invention has a crawler-type traveling unit (not shown) and a digging mechanism 102 like the conventional one shown in FIGS. 20 and 21. The crawler traveling unit is omitted since it is the same as that described earlier and illustrated in FIGS. 20 and 21.

FIG. 1 shows the transplant apparatus 101 whose buckets 106 are in their closed positions in a plan view. The right and left buckets 106 each have a sawtooth-like inner edge 123 meet each other.

Figure 2:
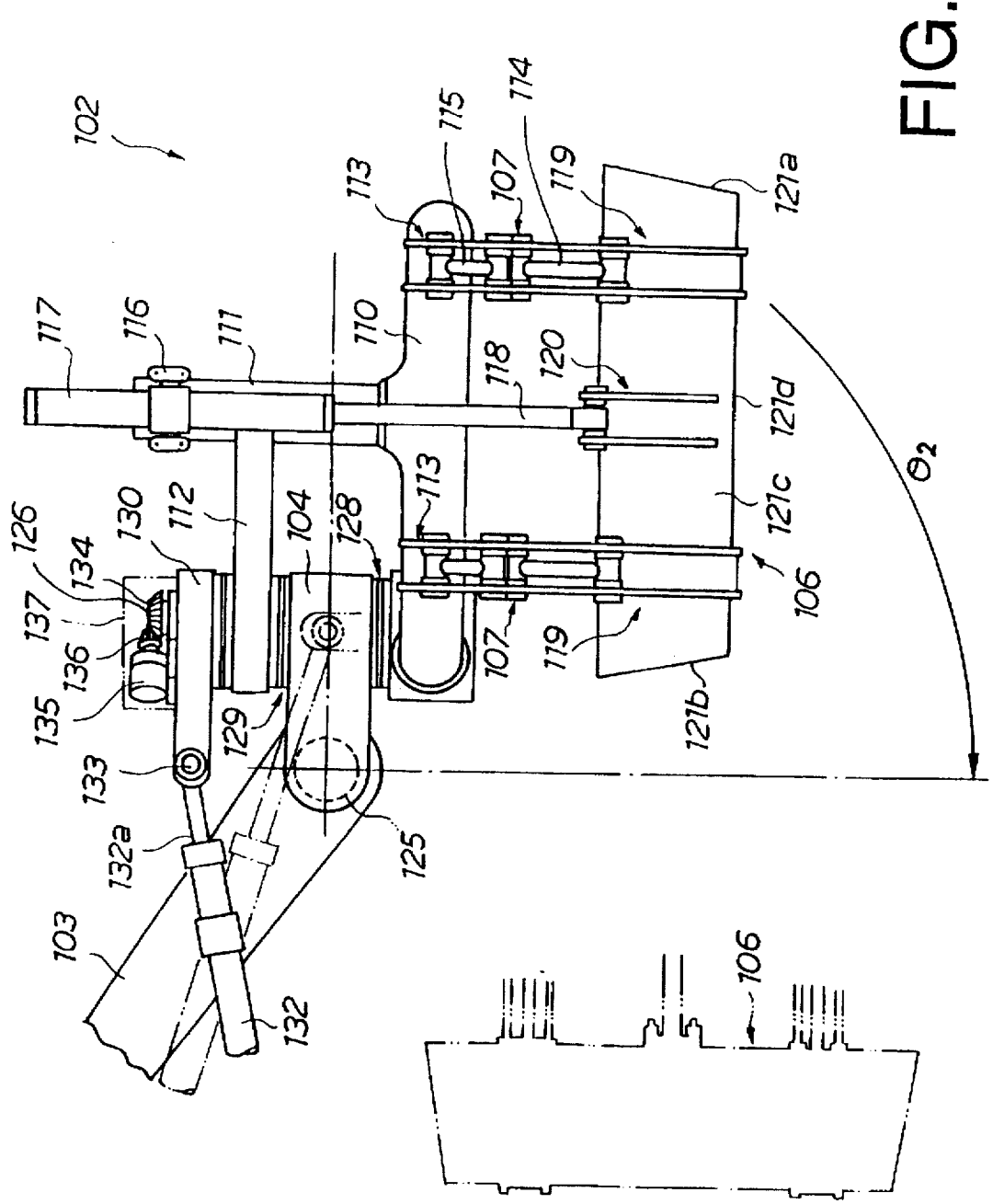
FIG. 2 is a right side view of the transplant apparatus shown in FIG. 1.

As illustrated in FIG. 1, the digging mechanism 102 has a main frame 105 adapted to be moved up and down like the conventional transplant apparatus. It should be noted however that the main frame 105 is not lifted by a pair of arms but by a single arm 103 and the main frame 105 is not directly attached to the arm 103 but there is provided an intermediate frame 104 between the main frame 105 and the arm 103. The single arm 103 is designed to have a sufficient strength to support and lift the main frame 105 and extend from the traveling unit (not shown) in such a direction that the arm 103 can move up and down without interfering with other members or parts of the transplant apparatus 101. FIG. 2 illustrates the right side view.

Figure 3:
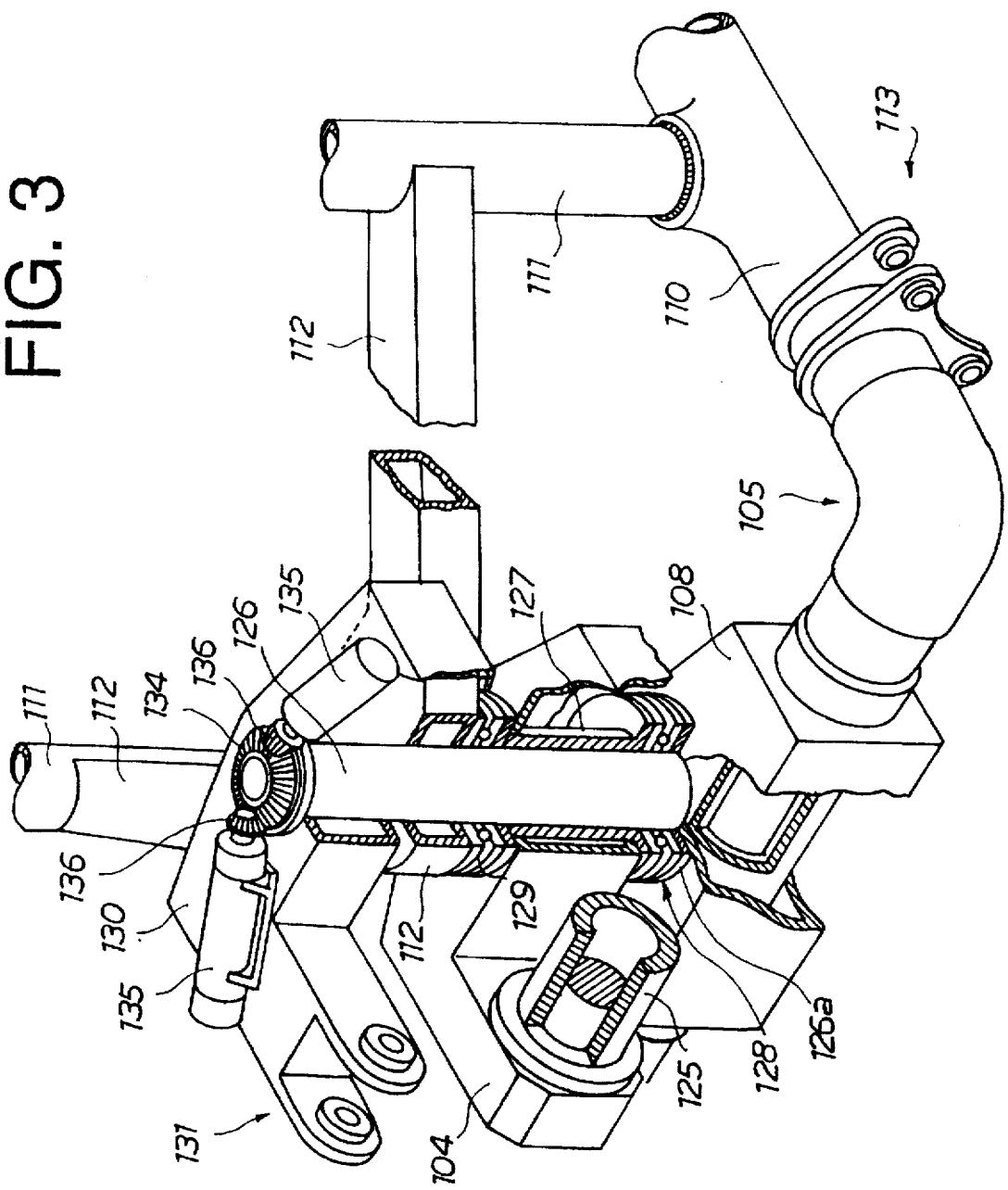
FIG. 3 is a fragmentary enlarged perspective view of part of the transplant apparatus shown in FIG. 1.

Referring to FIG. 3, depicted is a detail of the intermediate main frame 104 and frame 105 with their neighboring members. The main frame 105 is a U-shaped member and extends through a box-like member 108. The box-like member 108 is provided over the connecting portion of the "U"-shaped main frame 105. The main frame 105 and box-like member 108 are a single element. Two parallel "l" portions of the "U" of the frame 105 form a pair of forwardly extending portions 110. Right and left posts 111 vertically stand from the associated forwardly elongated portions 110 respectively at an approximate center of the elongated portion 110. A V-shaped member 112 connects the right and left posts 111 with each other above the main frame 105. The main frame 105, the box-like member 108, the posts 111 and the connection member 112 form a single unit and may be referred to as a main frame assembly or simply main frame. The connection member 112 reinforces the main frame.

The intermediate frame 104 has a traverse shaft 125, to which the front end of the lifting arm 103 is pivotably connected (FIG. 1). The transverse shaft 125 extends in a width direction of the main frame 105 (right-and-left direction in FIG. 1). The intermediate frame 104 is able to pivot about the transverse shaft 125 (clockwise and counterclockwise directions in FIG. 2).

The main frame 105 can pivot about a vertical shaft 126 extending in a height direction of the main frame 105 (up-and-down direction in FIG. 2). This pivotal movement can take place relative to the intermediate frame 104. For example, the main frame 105 may be pivoted while the intermediate frame 104 is stationary. The vertical shaft 126 has a flange 126a at its bottom, and the flange 126a is fixed to the box-shaped member 108. Thus, the vertical shaft 126 stands on the box-shaped member 108. The vertical shaft 126 extends upward through the intermediate frame 104. Specifically, the vertical shaft 126 penetrates a sleeve 127 embedded in the intermediate frame 104 and is rotatable relative to the sleeve 127 and intermediate frame 104.

The sleeve 127 has radially extending flange portions at its bottom and top respectively. A first thrust ball bearing 128 is provided between the lower flange portion of the sleeve 127 and the flange 126a of the vertical shaft 126. Similarly a second thrust ball bearing 129 is provided on the upper flange portion of the sleeve 127. The bending portion of the V-shaped connection member 112 rests on the second thrust ball bearing 129. The vertical shaft 126 also penetrates the connection member 112. The vertical shaft 126 is fixed to the connection member 112. A tilt frame 130 is provided above the connection member 112. The vertical shaft 126 extends through the tilt frame 130 and is rotatable relative to the tilt frame 130.

Referring back to FIG. 1, the tilt frame 130 has a pair of connections 131 on its right and left sides. The connections 131 extend rearward in parallel to each other along the lifting arm 103 in a top view. Each connection 131 has a fork end at its rear end, and a rod 132a of each tilt cylinder 132 is connected to the rear end of the connection 131 by a pin 133. The tilt cylinders 132 extend from the traveling unit (not shown) in parallel to each other along the lifting arm 103 like the conventional transplant apparatus. As understood from FIG. 2, extension and retraction of the rods 132a of the tilt cylinders 132 cause the digging unit 102 including the intermediate frame 104 to rotate about the transverse shaft 125 whereby the digging unit 102 takes a forwardly or rearwardly inclined posture.

Referring to FIG. 2, the vertical shaft 126 terminates at a certain position above the tilt frame 130 and has a bevel gear 134 at its free or top end. As best seen in FIG. 1, a pair of gear motors 135 is located on the tilt frame 130. A bevel gear 136 of smaller diameter is attached to a motor shaft of each gear motor 135 such that it meshes with the bevel gear 134. It should be noted that the bevel gear 134 and the right and left gear motors 135 are housed by a cover 137 (phantom line in FIGS. 2 and 4).

The right and left gear motors 135 cause in combination the vertical shaft 126 to rotate about its longitudinal axis by way of the bevel gears 134 and 136 so that the frame 105 can rotate about the vertical shaft 126 relative to the intermediate frame 104 and tilt frame 130.

The intermediate frame 104 constitutes means for connecting the main frame 105 with the lifting arm 103 in a way that the main frame 105 is able to swing about the vertical shaft 126. The intermediate frame 104 may be stopped while the main frame 105 is rotating.

Figure 4:
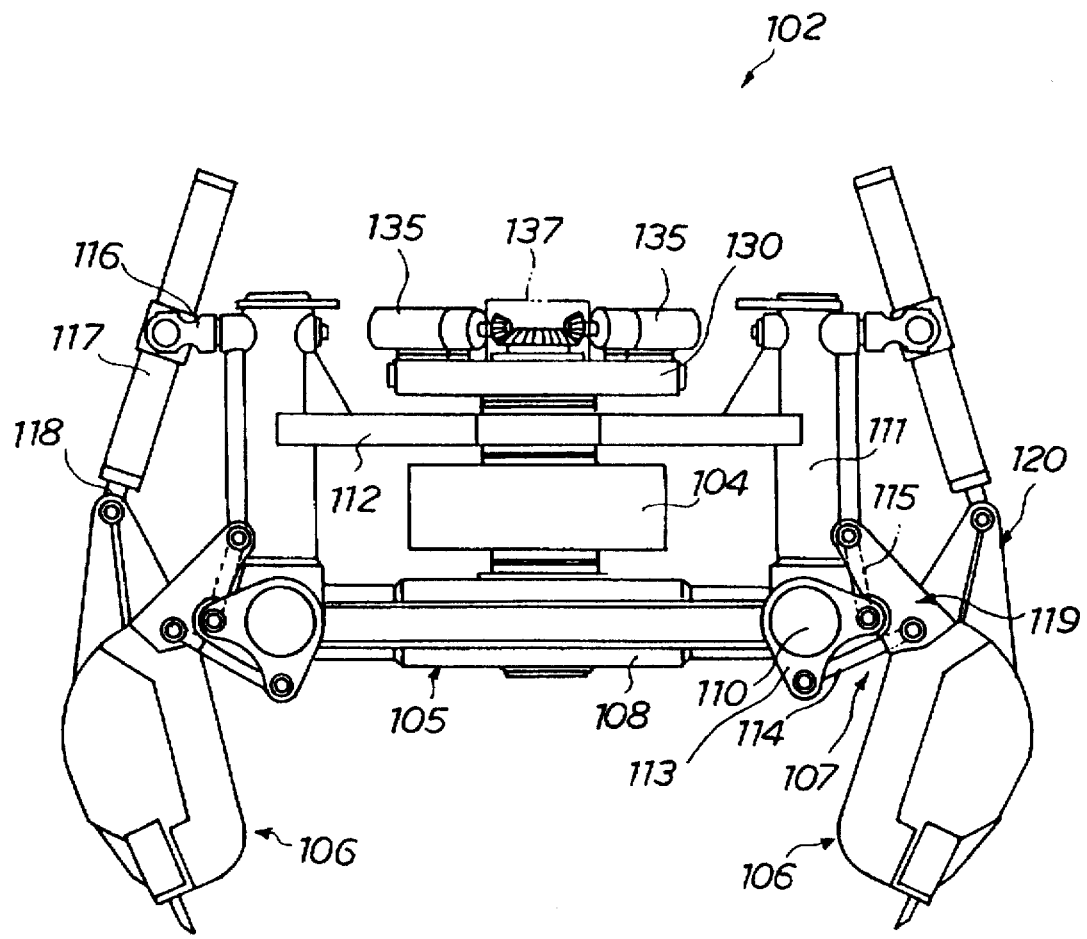
FIG. 4 is a front view of the transplant apparatus shown in FIG. 1 when the buckets are opened.

As illustrated in FIG. 1, two parallel brackets 113 are mounted on each of the forwardly elongated portions 110 of the main frame 105 near front and rear ends of each forwardly elongated portion 110 respectively. As best seen in FIG. 3, each bracket 113 includes two generally triangle planar members and a relatively large opening is formed in each planar member. The forwardly elongated portion 110 fits in these openings. Referring to FIG. 4, each bracket 113 is provided with a linkage mechanism 107. Specifically, each link mechanism includes a relatively long and short link bars 114 and 115, and one end of the longer link bar 114 and one end of the shorter link bar 115 are pivotably attached to each bracket 113 respectively. The other ends of the long and short link bars 114 and 115 of each link mechanism 107 are pivotably attached to the right or left bucket 106 respectively. Accordingly, each bucket 106 is swingably supported by the main frame 105 by means of the link mechanism 107. In FIG. 4, the right and left buckets 106 are swingable clockwise and counterclockwise.

As shown in FIG. 3, the link bars 114 and 115 extend between the two Parallel planar members of each bracket 113 in the lateral view.

Referring to FIG. 4, another bracket 116 is provided at an upper end of each post member 111. The bracket 116 is rotatable in a plane perpendicular to the sheets of FIGS. 1 and 4. As best illustrated in FIG. 1, each bracket 116 is a U-shaped member in the top view. The U-shaped brackets 116 extend outwardly in the width direction of the digging unit 102 or transverse direction so that they position beside the forwardly elongated portions respectively. A hydraulic cylinder 117 is supported by each bracket 116 such that it can rotate in a plane of FIG. 4. The hydraulic cylinder 117 is illustrated to be clamped by each bracket 116 in FIG. 1. Referring to FIG. 2, each hydraulic cylinder 117 has a rod 118 extending downwardly. The lower free end of the rod 118 of each hydraulic cylinder 117 is pivotably connected to the associated bucket 106. Therefore, as understood from FIG. 4, the right and left buckets 106 are moved clockwise and counterclockwise in the width direction of the digging unit 102 between their opened positions and closed positions as the hydraulic cylinders 117 extend and retract their rods 118. FIG. 4 depicts when the cylinder rods 118 are retracted or when the right and left buckets 106 are in the opened positions and FIG. 1 depicts when the cylinder rods 118 are extended or when the buckets 106 are in the closed positions.

Referring to FIG. 2, each bucket 106 has front and rear brackets 119 and a center bracket 120 which are spacedly formed in the longitudinal direction of the bucket 106. The front and rear brackets 119 have the same structure. The front and rear brackets 119 are provided for connecting the associated bucket 106 with the link bars 114 and 115 of the front and rear link mechanisms 107 respectively. The lower ends of the link bars 114 and 115 of each linkage 107 are pivotably connected to the associated bracket 119 respectively. Each of the brackets 119 includes two parallel planar members. The center bracket 120 is provided for connecting the rod 118 of the hydraulic cylinder 117 with the associated bucket 106. The center bracket 120 also includes two parallel planar members. These brackets 119 and 120 are integrated members of the associated bucket 106.

When the right and left buckets 106 are in the closed positions as shown in FIG. 1, the sawtooth-like inner edges 123 of the buckets 106 engage with each other and the buckets 106 form a bowl whose top is opened to the air.

Referring to FIG. 2, each bucket 106 has a front portion 121a, a rear portion 121b, an outer side portion 121c and a bottom portion 121d. As shown in FIG. 1, each bottom portion 131d has the zigzag portion comprised of a plurality of triangle claws 123 along its inner edge. The zigzag inner edges 123 of the buckets 106 facilitate the digging operation when the digging unit 102 scoops the ground and digs up a root of a tree.

A pair of shorter and longer link bars 114 and 115 of each link unit 107 forces the associated bucket 106 to move in an oval orbit, not a circular orbit, when the rod 118 of the associated hydraulic cylinder 117 is extended and retracted. Specifically, if the cylinder rod 118 is extended, the associated bucket 106 is first lowered vertically and then translated horizontally.

Now, operations of the transplant apparatus 101 of this embodiment will be described.

Figure 5:
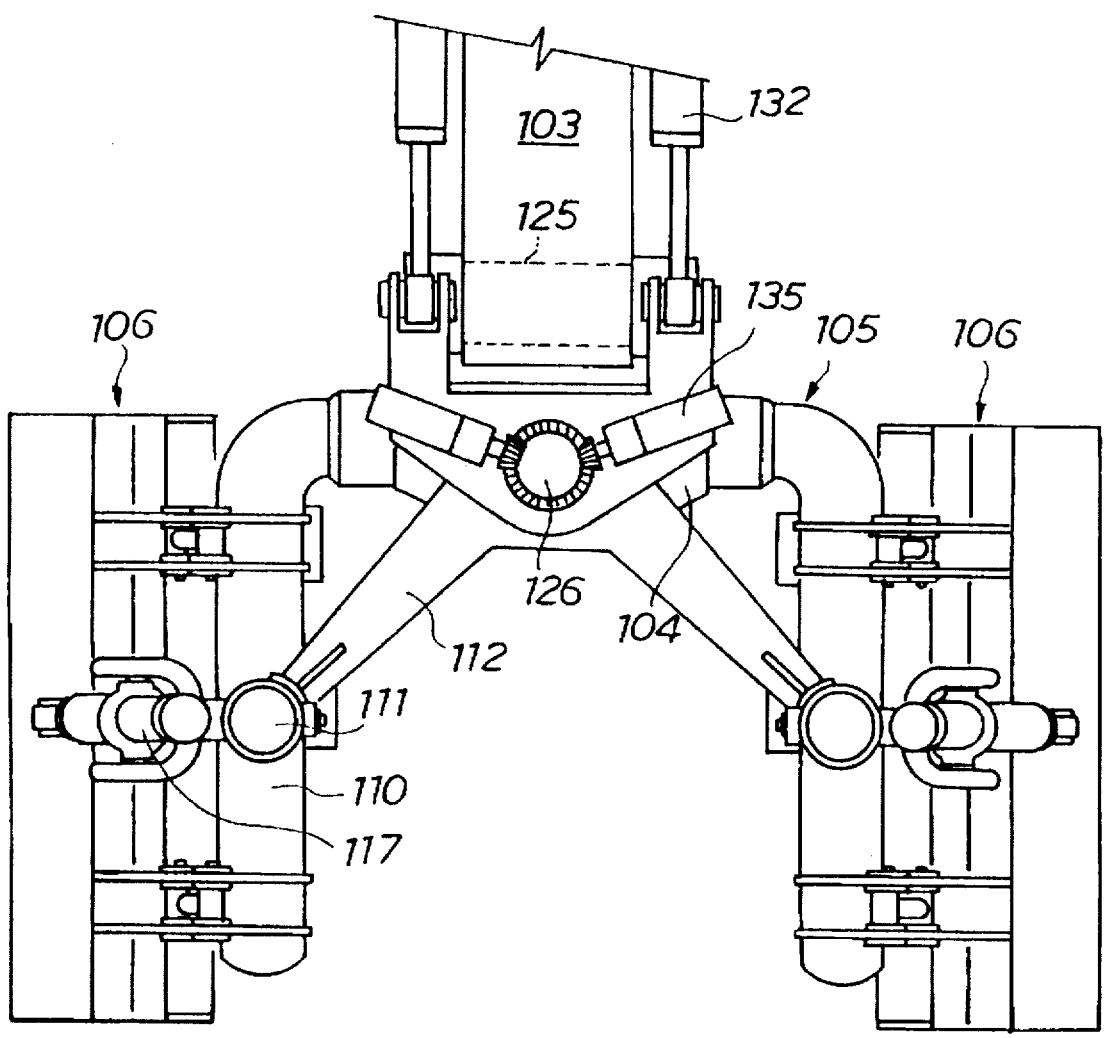
FIG. 5 is a top view of the transplant apparatus shown in FIG. 4.

Before the digging operation, the lifting arm 103 is actuated by a lifting cylinder (not shown) so that the buckets 106 are held at appropriate positions above the ground. Then, the hydraulic cylinders 117 are actuated to retract their rods 118 so that the buckets 106 take their opened positions as illustrated in FIGS. 4 and 5. The transplant apparatus 101 is driven to a target tree such that the buckets 106 sandwich the target tree (see FIG. 21). A channel of a particular depth is formed around a root of the tree. Then, the arm 103 is lowered into the channel and the hydraulic cylinders 117 are activated to extend their rods 118 thereby swinging the buckets into the closed positions (FIG. 1). The claws 123 of the buckets 106 are squeezed into the ground, the root of the tree is cut accordingly and the buckets 106 die the tree (see FIG. 15).

The buckets 106 in the closed positions serve like human hands abutting at their fifth finger's sides, thereby holding the tree satisfactorily. The buckets 106 are lifted up to a suitable height above the ground by the arm 103 while keeping their closed postures, and the transplant apparatus 101 moves to another place using its traveling unit (not shown).

A hole sufficient for receiving the tree (not shown) is formed at a desired place beforehand. When the transplant apparatus 101 arrives at the destination, the buckets 106 are lowered into the hole and moved to the opened positions to release the tree. After depositing the tree, the buckets 106 are lifted up from the hole, and earth filled in over the root of the tree to complete the transplant operation.

It should be noted that that face of the tree which is directed, for example, to the south before dug should also be directed to the south after transplanted as mentioned earlier. The route to the destination may be limited for the transplant apparatus 101 so that the south-directed face of the tree prior to the digging may now be oriented, for instance, to the east. Particularly, the transplant apparatus 101 has a relatively long figure in its fore-and-back direction since the digging unit 102 and the traveling unit are arranged in tandem in the fore-and-back direction. Thus, it is often difficult for the transplant apparatus 101 to change its direction at the destination. In consideration of this, the transplant apparatus 101 of this embodiment has the vertical shaft 126 and the drive mechanism therefor so that the main frame 105 is rotatable about the vertical shaft 126 while the buckets 106 are holding the tree. Consequently, the direction of the tree can be changed arbitrarily before landing the tree. Thus, the transplant apparatus 101 of the invention does not need a separate crane, which the conventional one shown in FIGS. 20 and 21 requires, in the transplanting operation. Further, the crane necessitates a relatively large space to change the direction of the tree, but the present invention can turn the tree in a relatively small space. In this manner, serviceability of the transplant apparatus is greatly improved.

The buckets 106 are adapted to rotate to the right and left respectively from the normal position by a relatively large angle. In the present invention, the rotatable angle is 90 degrees as indicated by θ1 in FIG. 1. Of course the angle θ1 is not limited to 90 degrees.

In the illustrated embodiment, the intermediate frame 104 extends forwardly from the transverse shaft 125 so that the mounting position of the main frame 105 is offset to the forward from the lifting arm 103. Therefore, as understood from FIG. 2, the digging unit 102 or the buckets 106 are able to rotate about the transverse shaft 125 by 90 degrees from the horizontal position as indicated by θ2. The right bucket 106 will take a position as indicated by the phantom lines after the 90-degree rotation or bowing operation. Therefore, the serviceability of the transplant apparatus is also improved. In addition, the main frame 105 and the buckets 106 can be folded or retracted inward when the transplant apparatus 101 is not in use. Thus, space necessary for the transplant apparatus 101 in the stand-by condition is reduced. It should be noted that the angle θ2 is not limited to 90 degrees.

Referring to FIG. 1 again, rotation of the main frame 105 about the vertical shaft 126 is adjusted by the gear motors 135. In other words, remote control to the rotation of the main frame 105 is possible. In this embodiment, each gear motor 135 is an electrical motor having a speed reduction mechanism therein. Thus, it is possible to rotate the main frame 105 at a relatively slow speed. Since there are provided two gear motors 135, it is possible to generate a torque sufficient to rotate the main frame 105 even if the buckets 106 are carrying the tree. The gear motors 135 serve as means for driving the frame 105. It should be noted that other drive means such as hydraulic motors or cylinders may be employed instead of the gear motors 135.

It should also be noted that the main frame 105 may be rotated about the vertical shaft 126 in the digging operation and/or during transportation to the designated place. Therefore, even if the approaching route to the target tree for the transplant apparatus 101 is limited, the digging direction is not limited and it is possible to dig the tree from the best direction.

Although the vertical shaft 126 is fixed to the main frame 105 and driven by the gear motors 135 in the foregoing embodiment, the vertical shaft 126 may be firmly attached to the intermediate frame 104 and the gear motors 135 may be directly mounted on the main frame 105. In this case, the main frame 105 may rotate while the vertical shaft 126 is being stationary. In the illustrated embodiment, the main frame 105 and the vertical shaft 126 are integrated so that they rotate together.

It should also be noted that the vertical shaft 126 may be free from both of the frames 104 and 105. In this case, a drive may be provided for causing relative rotation between the frames 104 and 105.

An annular recess may be formed in a surface of the vertical shaft 126 and a mating annular projection may be formed on a surface of the intermediate frame 104.

Furthermore, the transplant apparatus 101 may include only one bucket 106 or more than two buckets 106. The configuration and structure of each bucket 106 may be changed in accordance with a particular application. For instance, a bucket having a shape other than the illustrated one may be employed if a shape of a root of a tree to be dug is different from the illustrated one.

SECOND EMBODIMENT

Figure 6:
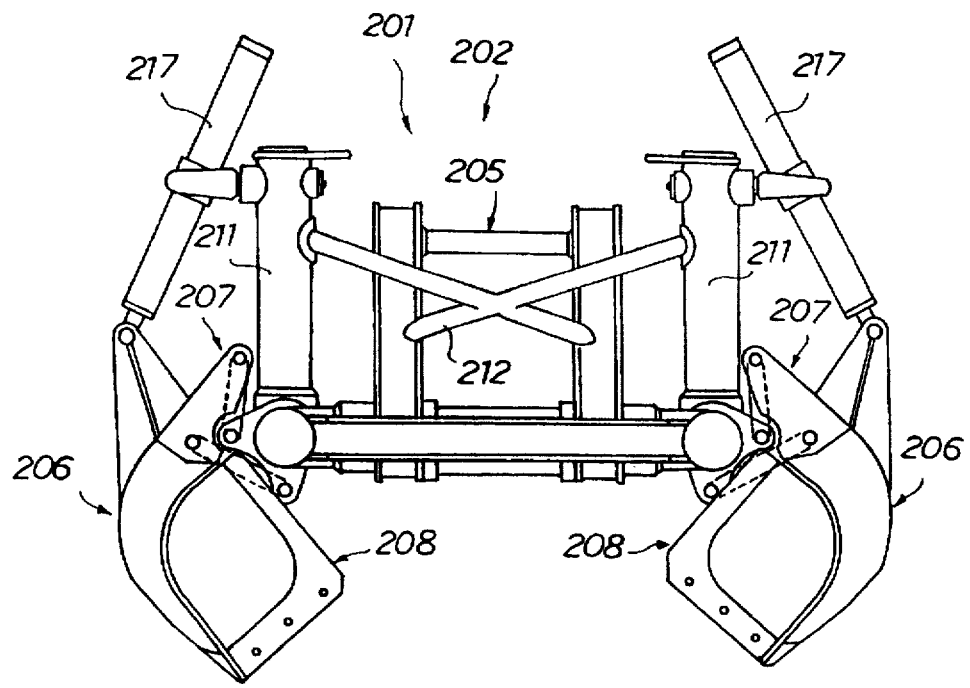
FIG. 6 is a front view of a transplant apparatus according to a second embodiment of the present invention before a digging operation.

Referring to FIG. 6, illustrated is a front view of a transplant apparatus 201 of a second embodiment. A traveling unit for transportation of the transplant apparatus (i.e., a crawler unit) and a cylinder unit for movement of a main arm 203 attached to a digging unit 202 are omitted in the illustration like the first embodiment. The transplant apparatus of this embodiment is similar to that shown in FIGS. 1 to 5 and includes the crawler unit (not shown) and a cylinder unit (not shown) like the conventional transplant apparatus shown in FIGS. 20 and 21.

As illustrated in FIG. 6, the transplant apparatus 201 includes the digging unit 202 and the digging unit 202 includes a main frame 205 and a pair of right and left buckets. Each bucket includes a first bucket 206 and a second bucket 208. The first bucket 206 is pivotably connected with the main frame 205 via a linkage 207 and the second bucket 208 is detachably connected with the first bucket 208.

Figure 7:
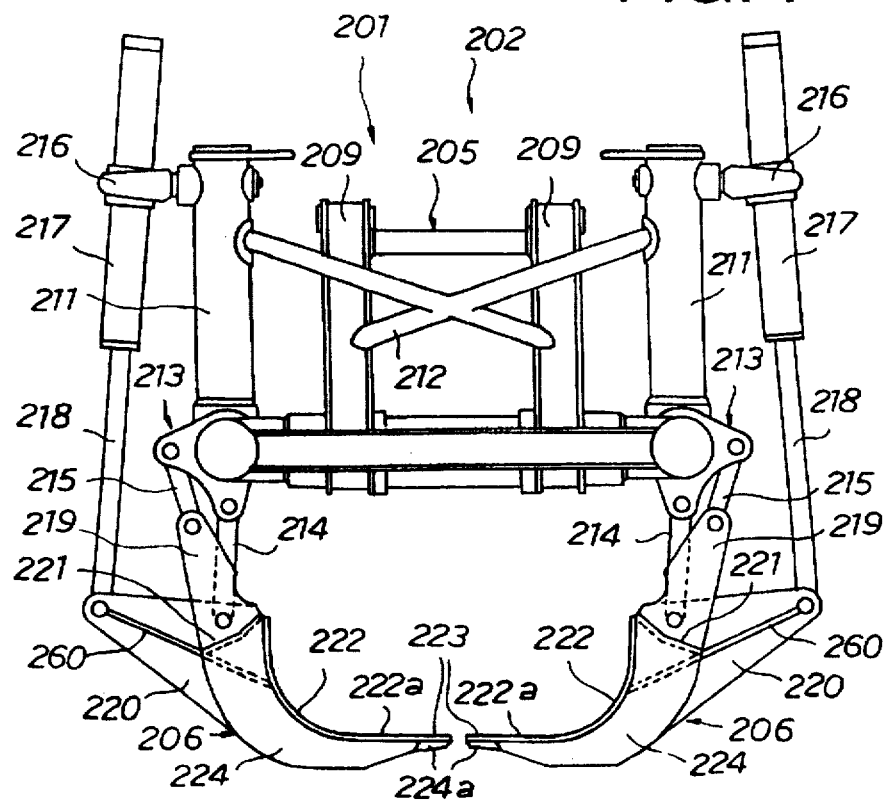
FIG. 7 is a front view similar to FIG. 6 showing the apparatus in a digging operation, with second buckets being omitted.
Figure 8:
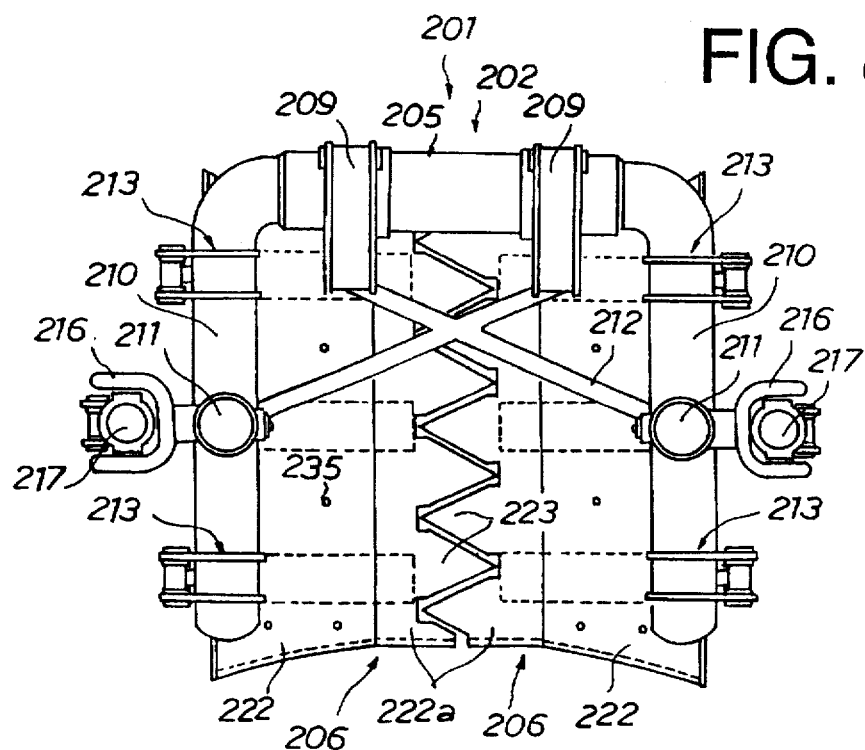
FIG. 8 is a top view of a digging unit of the transplant apparatus shown in FIG. 7.
Figure 9:
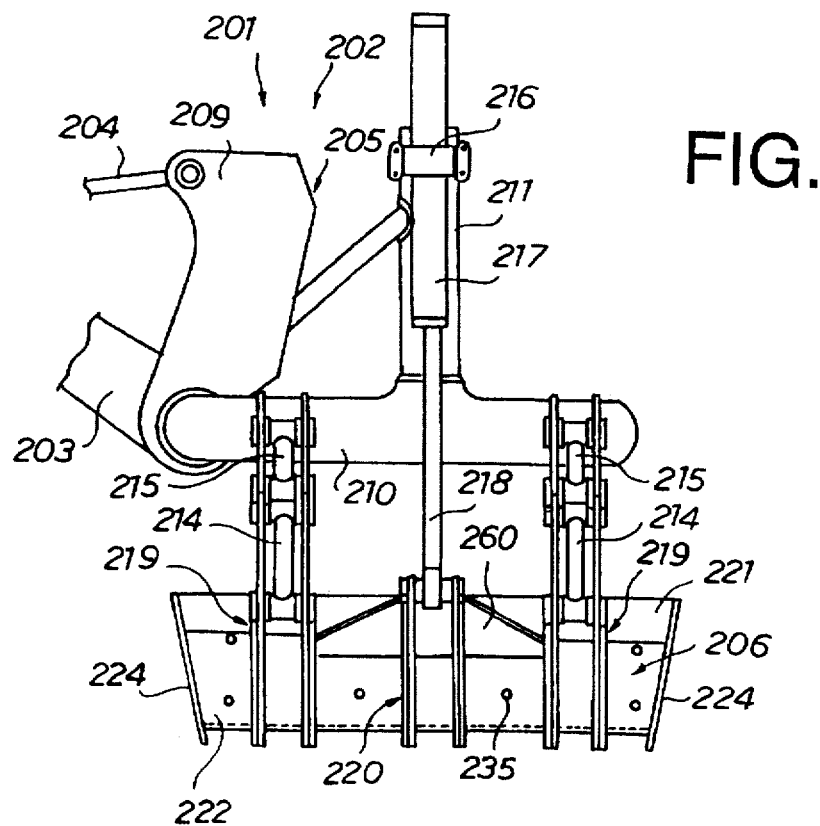
FIG. 9 is a right side view of the digging portion of the transplant apparatus shown in FIG. 7.

FIGS. 7 to 9 illustrate the digging unit 202 of the transplant apparatus 201 without the second buckets 208. A front view is depicted in FIG. 7, a plan view is depicted in FIG. 8 and a right side view is depicted in FIG. 9.

As illustrated in FIG. 9, the lifting arm 203 and a pair of tilt arms 204 are pivotably connected to the main frame 205.

The main frame 205 includes a pair of unstraight members 209 (best seen in FIG. 7) for pivotable connection to the lifting arm 203 and the tilt arms 204. The lifting arm 203 is connected to a lower end of the unstraight members 209 and the tilt arms 204 are connected to an upper end. The main frame 205 also includes a U-shaped member 210, two parallel legs of the "U" extending forwardly as best illustrated in FIG. 8. The upright members 209 spacedly stand on the connecting portion of the "U". The right and left tilt arms 204 (FIG. 9) are connected to the right and left upright members 209 respectively and the lifting arm 203 (FIG. 9) extends between the two upright members 209 in FIG. 8. A post 211 extends upward from each leg of the "U"-shaped member 210. Connection of the post 211 with the U-shaped member 210 is an approximate center of each leg of the "U". The right and left posts 211 and the right and left unstraight members 209 are coupled with each other by a X-shaped reinforcement member 212. These members 209, 210, 211 and 212 are integrated members of the main frame 205. Each leg of the "U"-shaped member 210 has two brackets 213 near its front and rear ends. Each bracket 213 includes two parallel triangle plates which are similar to those illustrated in FIG. 3 (bracket 113 of the first embodiment). As best depicted in FIG. 7, a relatively long link bar 214 and a relatively short link bar 215 are pivotably connected to two of three peaks of the triangle shape of each bracket 213 at their upper ends respectively. As understood from FIGS. 7 and 8, a U-shaped bracket 216 is mounted on an upper end of each post member 211. Each U-shaped bracket 216 pivotably supports a hydraulic cylinder 217 as understood from FIGS. 6 and 7. Each cylinder 217 has a rod 218 which is extended and retracted for moving the buckets.

It should be noted that the main frame 205 is different from that of the first embodiment in that it is directly mounted on the lifting arm 203 as shown in FIG. 9 (i.e., no intermediate frame is provided). Thus, the main frame 205 of this embodiment cannot turn right and left, and it is only able to tilt in an up-and-down direction (clockwise and counterclockwise directions in FIG. 9) about the axis defined along the connecting part of the U-shaped member 205.

Referring back to FIG. 7, a lower end of each longer link bar 214, a lower end of each shorter link bar 215 and a lower end of the rod 218 of each hydraulic cylinder 217 are pivotably connected with the associated first bucket 206 respectively. The first bucket 206 includes front and rear brackets 219 and a center bracket 220 as shown in FIG. 9. The front and rear brackets 219 have the same structure. The front (or rear) bracket 219 includes two parallel plates. The lower end of each longer link bar 214 and that of each shorter link bar 215 are pivotably attached to the front (or rear) bracket 219 respectively (FIGS. 7 and 9). The lower end of the rod 218 of each hydraulic cylinder 217 is pivotably connected to the center bracket 220. Each center bracket 220 includes two parallel plates. These brackets 219 and 220 are mounted on an associated mounting member 221 and digging plate 222 respectively (FIGS. 7 and 9). The brackets 219, 220, the mounting member 221 and the digging plate 222 are integrated members of the first bucket 206. A reinforcement plate 260 is provided to connect the center bracket 220, the mounting plate 221 and the scooping plate 222. Each scooping plate 222 has an L shape as viewed from the front (FIG. 7). The corner of "L" is smoothly rounded. The front edge of each scooping plate 222 is curved rearward slightly as viewed from the top (FIG. 8). When the right and left scooping plates 222 meet each other as shown in FIG. 8, the front edges of the two mating scooping plates 222 form a gentle arc. An inner edge 222a of each scooping plate 222 has a plurality of triangular claws 223. These claws 223 engage with each other when the right and left first buckets 206 are in their closed positions. As illustrated in FIG. 9, scratching plates 224 are fixedly attached to the front and rear ends of each scooping plate 222. The scratching plates 224 extend from the associated scooping plate 222 at right angles. These plates 224 and the brackets 219 and 220 reinforce the associated scooping plate 222. The plates 224 and the bracket 219 and 220 extends downwardly beyond the associated scooping plate 222 and they terminate at the same level in the lateral view. As shown in FIG. 7, each scratching plate 224 has a generally L shape and extends along the associated scooping plate 222 so that it covers the outer surface of the scooping plate 222 in the front view. The brackets 219 and 220 have a similar relation with the scooping plate 222 although they are not seen in FIG. 7. Each scratching plate 224 has a pointed free end 224a. Each of the brackets 219 and 220 also has a similar pointed free end (not shown). These sharp free ends of the brackets 219 and 220 and scratching plates 224 and the claws 223 of the scooping plates 222 facilitate the digging operation. As illustrated in FIG. 8, a plurality of through openings 235 is spacedly formed in the scooping plate 22.

Upon extension and retraction of the cylinder rods 218 of the hydraulic units 217, the right and left first buckets 206 are moved between the opened positions (FIG. 6) and the closed positions (FIG. 7). It should be noted that the link bars 214 and 215 have different lengths so that movement of each first bucket 206 between the closed and opened positions is not a simple circle, but oval, like the first embodiment. For instance, as the hydraulic cylinder 217 extends its rod 218, the first bucket 206 first moves vertically downward and then horizontally inward.

Figure 10:
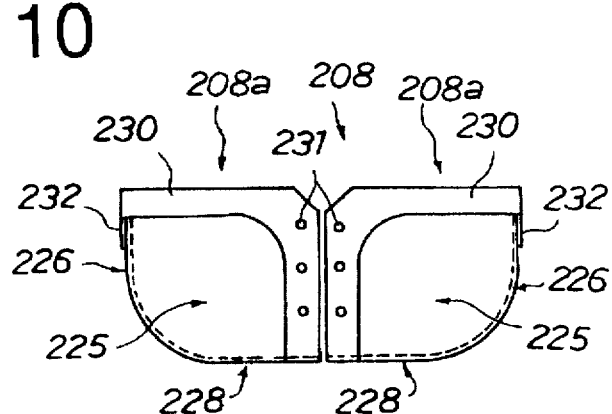
FIG. 10 illustrates the second Buckets of the transplant apparatus shown in FIG. 6.
Figure 11:
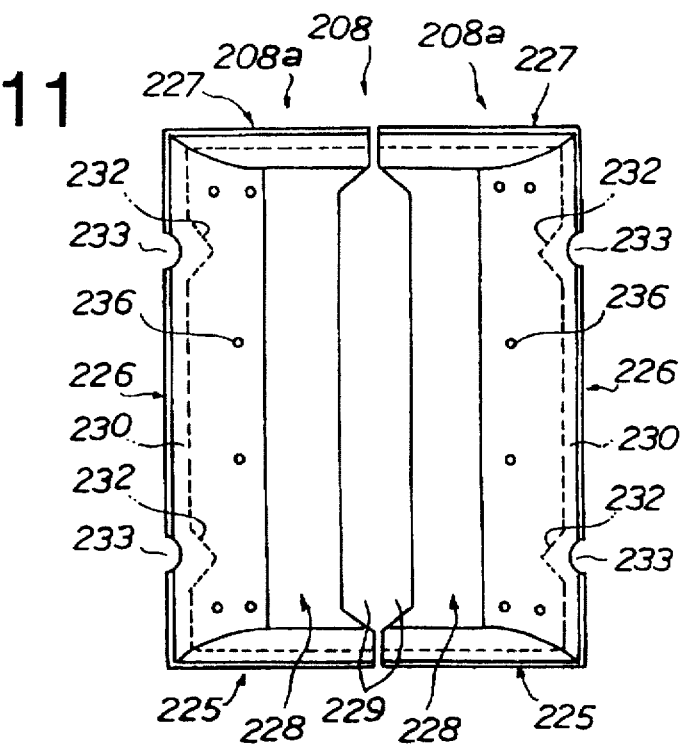
FIG. 11 is a plan view of the second buckets shown in FIG. 10.
Figure 12:
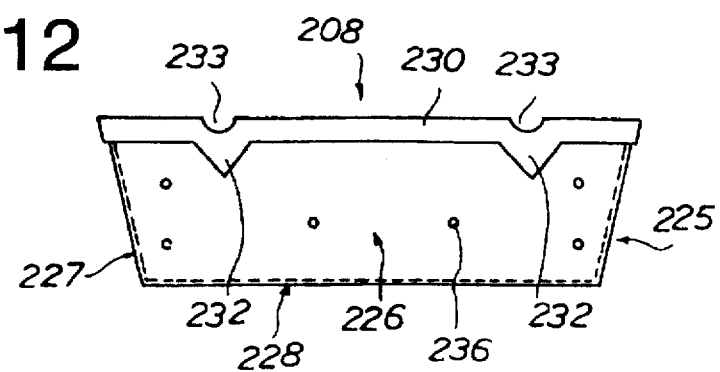
FIG. 12 is a lateral view of the second buckets shown in FIG. 10.

FIGS. 10 to 12 illustrate the second bucket 208: FIG. 10 shows a front view, FIG. 11 a plan view and FIG. 12 a lateral view.

Figure 15:
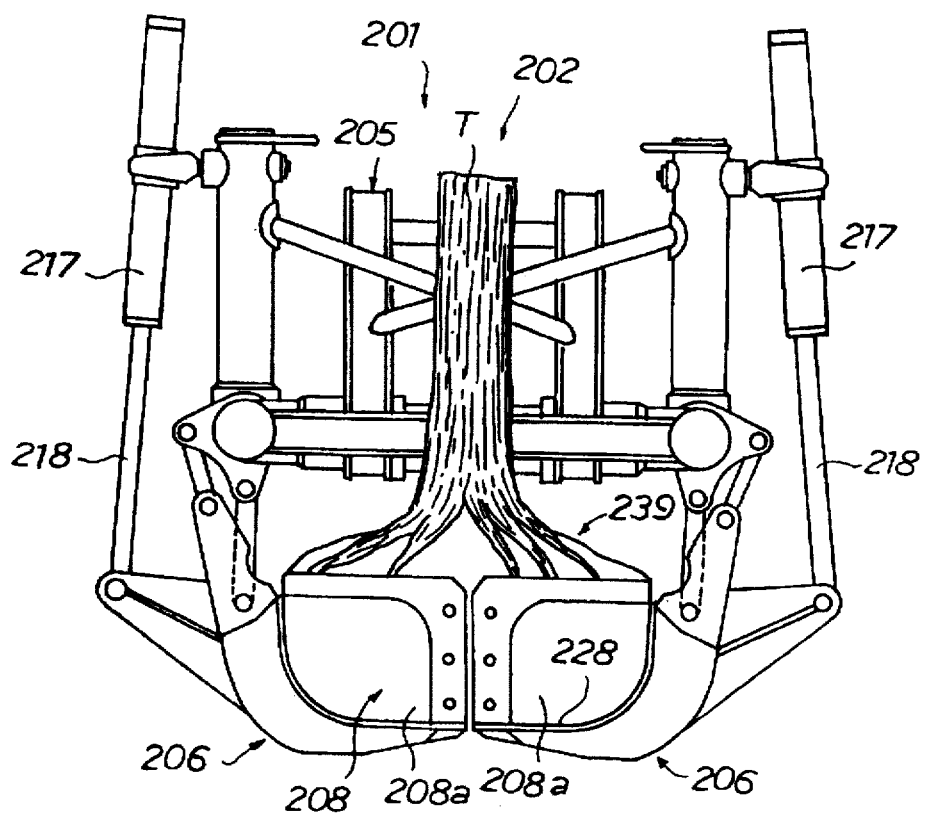
FIG. 15 is a front view similar to FIG. 7 showing the digging operation of the transplant apparatus of the second embodiment.

As understood from these illustrations, the second bucket 208 includes a pair of bucket main bodies 208a attached to the associated (right and left) first buckets 206 respectively. The two main bodies 208a are divisible. Each bucket main body 208a has an outer shape in conformity with an inner shape of the associated first bucket 206 so that it is received in the associated first bucket 206 (FIG. 6). The second bucket 208 becomes a bowl- or basket-like container having an open top as the main bodies 208a are united as shown in FIG. 10. Each main body 208a includes a front face 225, a lateral face 226, a rear face 227 and a bottom face 228 as understood from FIGS. 10 and 11. Each face of the main body 208a is made from a metallic plate material such as a steel plate. The bottom face 228 has a cut portion 229 which has dimensions determined according to width and depth of the claw portion 223 formed along the inner edge of each scooping plate 222 so that no load is exerted on the bottom face 228 when the claw portion 223 is forced to a root of a tree during the digging operation. The lateral face 226 is smoothly curved in accordance with the curved surface of the scooping plate 222. A continuous stepped portion 230 is formed along upper edges of the front, lateral and rear walls 225, 226 and 227 as illustrated in FIG. 11. The stepped portion 230 also extends along inner edges of the front and rear walls 225 and 227 as understood from FIG. 10 (front wall 225 is only shown in FIG. 10). A plurality of female threads 231 is spacedly formed in that part of the strip member 230 which extends along the inner edge of the front wall 225 (or rear wall 227). The female bores 231 formed in the right main body 208a and those formed in the left main body 208a have the same height positions when the two main bodies 208a are coupled as shown in FIG. 10. A couple of V-shaped or triangle projections 232 is formed on that part of the strip member 230 which is attached to the lateral wall 226 as best illustrated in FIG. 12. A semicircular cut portion 233 is formed in the strip member 230 above each triangle projection 232. The semicircular cut portions 233 are undercut recesses for movement of the long link bars 214 as understood from FIG. 6. A plurality of female thread bores 236 is formed in the lateral wall 226 of each second bucket 208a. These bores 236 are positioned to mate the bores 235 of the first bucket 206 when the second bucket 208a is placed on the mating first bucket 206 (FIG. 15).

Figure 13:
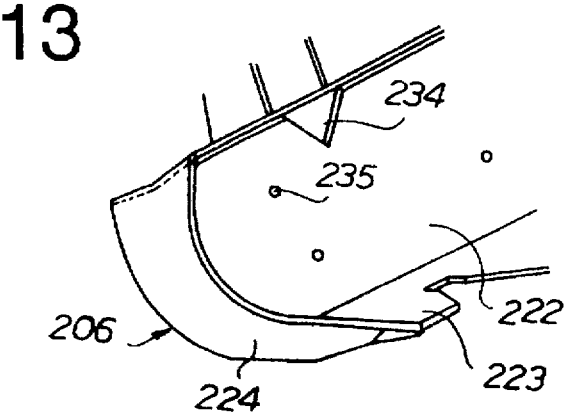
FIG. 13 is a fragmentary enlarged perspective view of first buckets of the transplant apparatus shown in FIG. 6.

Referring to FIG. 13 which illustrates the first bucket 206 in the perspective view, two V-shaped cut portions 234 (only one is depicted in FIG. 13) are formed in the outer edge of each scooping plate 222 to receive the two mating V-shaped portions 232 of the second bucket 208 (FIG. 12). Therefore, upon placing of the second bucket 208a over the mating first bucket 206, the V-shaped projection 232 fits in the V-shaped groove 234 and appropriate alignment or positioning of the second bucket 208a is insured.

Figure 14:
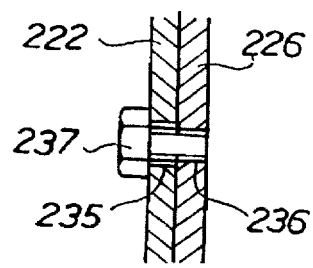
FIG. 14 is a vertical section of part of the transplant apparatus shown in FIG. 6 illustrating fixed connection between the first and second buckets.

The bores 235 formed in the scooping plate 222 of the first bucket 206 and the bores 236 formed in the lateral wall 226 of the mating second bucket 208a are formed to align with each other upon engagement of the first and second buckets 206 and 208a. As depicted in FIG. 14, therefore, it is possible to insert a bolt 237 into the through bore 235 from outside of the scooping plate 222 and thread it into the female bore 236. Accordingly, the second bucket 208a is firmly (but removably) attached to the associated first bucket 206. In this manner, the through hole 235, the female thread 236 and the bolt 237 cooperate to detachably fix the second bucket 208 to the associated first bucket 206.

The first bucket 206 and its associated members to drive the first bucket 206 serve in combination as means for driving or translating the second bucket 208. The first bucket 206 and its drive members removably support the second bucket 208, as understood from the foregoing description.

Now, operations of the transplant apparatus of the second embodiment will be described.

Figure 16:
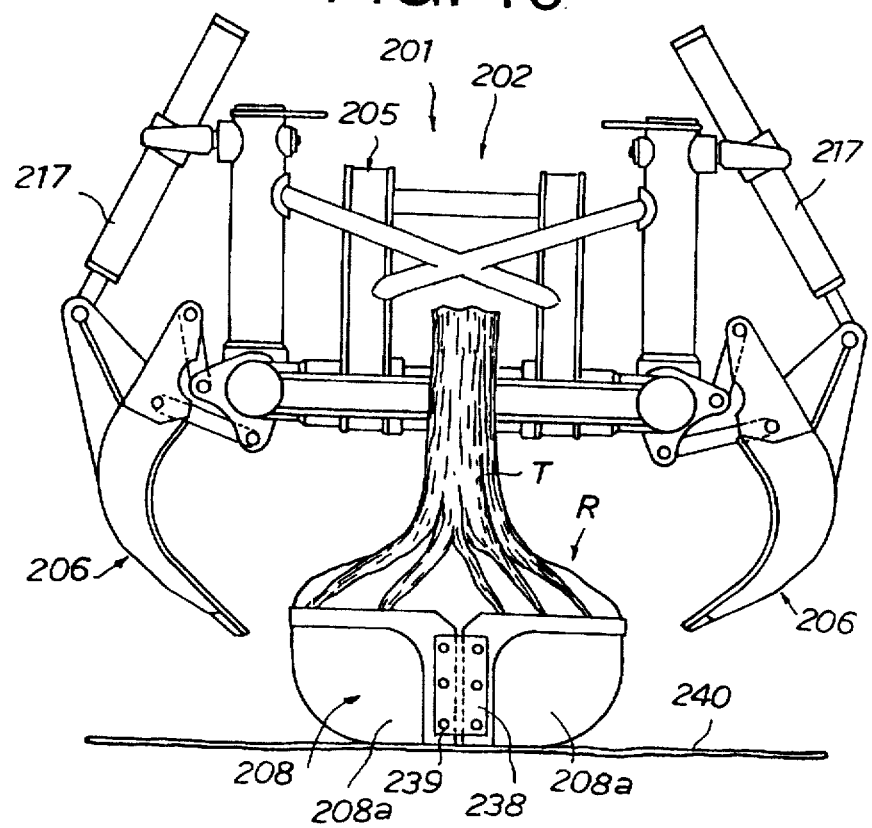
FIG. 16 is an illustration similar to FIG. 15 showing completion of the digging operation.

Prior to a tree digging operation, the second buckets 208a are fixedly mounted on the associated first buckets 206 and the first buckets 206 are moved to their opened positions, as shown in FIG. 6. The transplant apparatus 201 is operated to approach a place of the target tree such that the tree be positioned between the first buckets 206 (FIG. 16). The first buckets 206 are maintained at an appropriate height above the ground by a lifting cylinder (not shown). The rods 218 of the hydraulic cylinders 217 are retracted with the top halves thereof being inclined inwardly respectively as illustrated in FIG. 6.

A cavity is formed around the root portion of the tree beforehand (FIG. 21). The first buckets 206 are lowered into the cavity to scoop the root of the tree.

Referring to FIG. 15, the first buckets 206 are moved to closed positions by the hydraulic cylinders 217 (more specifically, by extension movement of the cylinder rods 218) when the root R of the tree T is scooped by the first buckets 206. When the first buckets 206 scoop the tree's root R, the claw-shaped inner edge 223 of the right first bucket 206 and the associated pointed edge 224a (FIG. 13) and those of the left first bucket 206 are moved in opposite directions generally in parallel to the ground or horizontally and eventually abut. FIG. 8 shows the closed first buckets 206 without the second buckets 208a. The pointed edge 224a are free ends of the plate 224 and brackets 219 and 220 (FIG. 9) and positioned below the claw edge 223. The second buckets 208a are fixed onto the first buckets 206 so that the lower walls 228 of the second buckets 208a are also slid or squeezed under the tree's root T as illustrated in FIG. 15. When the first buckets 206 are in the closed positions, the first buckets 206 do not contact tree's root R but the second buckets 208a on the first buckets 206 contact and hold the tree's root R. Then, the first buckets 206 are lifted up from the cavity together with the tree T. Before unloading of the tree, the right and left second buckets 208a are united by a connection plate 238 and bolts 239 (FIG. 16), a sheet 240 is spread over a predetermined place (FIG. 16) and the bolts 237 (FIG. 14) are unscrewed to free the second buckets 208a from the first buckets 206. The bolts 239 are engaged into the female threads 231 of the second buckets 208a. The tree T received and held by the integrated second buckets 208a is landed onto the sheet 240 upon opening of the first buckets 206 as depicted in FIG. 16. The first buckets 206 are moved to the opened positions by the hydraulic cylinders 217. The sheet 240 is made from a relatively stout material such as vinyl, cloth or fabric. A number of relatively thin strings or ropes 242 extend from an outer periphery of the sheet 240 and four relatively thick strings 241 extend from inner locations relative to the strings 242 (FIG. 17).

Figure 17:
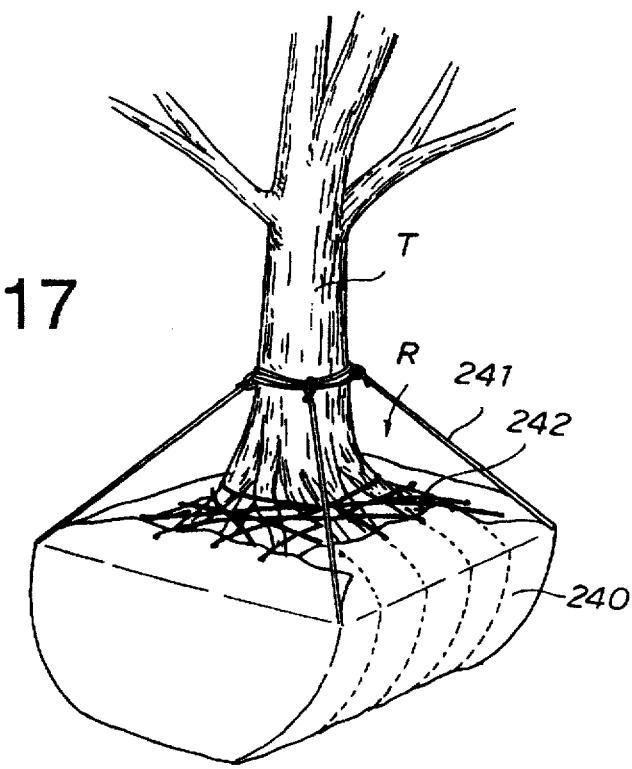
FIG. 17 is a perspective view of a tree as dug by the transplant apparatus.

After unloading the second buckets 208a and the tree T, the second buckets 208a and the root R of the tree T are enclosed by the sheet 240 using the strings 241 and 242 as shown in FIG. 17. The strings 241 is tied around a trunk of the tree T and the strings 242 are tightened around a root joint like a money pouch. In this manner, the sheet 240 can hold the tree's root R tightly and mud does not fall off.

The tree T is now ready for transportation. The tree T is loaded onto a truck or the like by a fork lift truck or shovel loader and transported to a destination.

As understood from the above, the transplant apparatus itself does not have to be transferred to a transplant site from a digging place. Only the second bucket 208 is moved to the transplant site. During the transportation of the tree to the transplant site, the transplant apparatus 201 can dig another tree. This raises a working efficiency. In addition, since the vehicle which carries the tree can drive on a highway so that long distance transportation is also feasible. This widens a freedom of choice regarding the transplant site of the tree. It is possible to relocate the tree T to an optimum place. This contributes to protection of the environment.

Furthermore, the second bucket 208 (i.e., the united second buckets 208a) functions as a flowerpot for the tree T since the tree T can stands vertically as supported by the second bucket 208. Therefore, it is possible to keep the tree T in a certain place such as in a warehouse after digging. The cut out portion 229 of each second bucket 208a (FIG. 11) serves as openings for water discharge from the root R of the tree T and for ventilation. Thus, the tree is stored under good environment. The sheet 240 (FIG. 17) may be taken off the tree's root T during storage. A net (not shown) or the like may be employed to prevent crumbling of the ground from the root R if the sheet 240 is removed.

It should be noted that the second buckets 208a of this embodiment would correspond to the buckets 106 of the first embodiment and the first buckets 206 are part of means for driving the second buckets 208a. Therefore, the first buckets 206 may be replaced by certain members which simply support and carry the second buckets 208a and which are not capable of digging the ground in a particular application. In such a case, the inner edge of each second bucket 208a is not a mere cut out portion 229, but it may have a plurality of claws similar to those 223 illustrated in FIG. 8.

Figure 18:
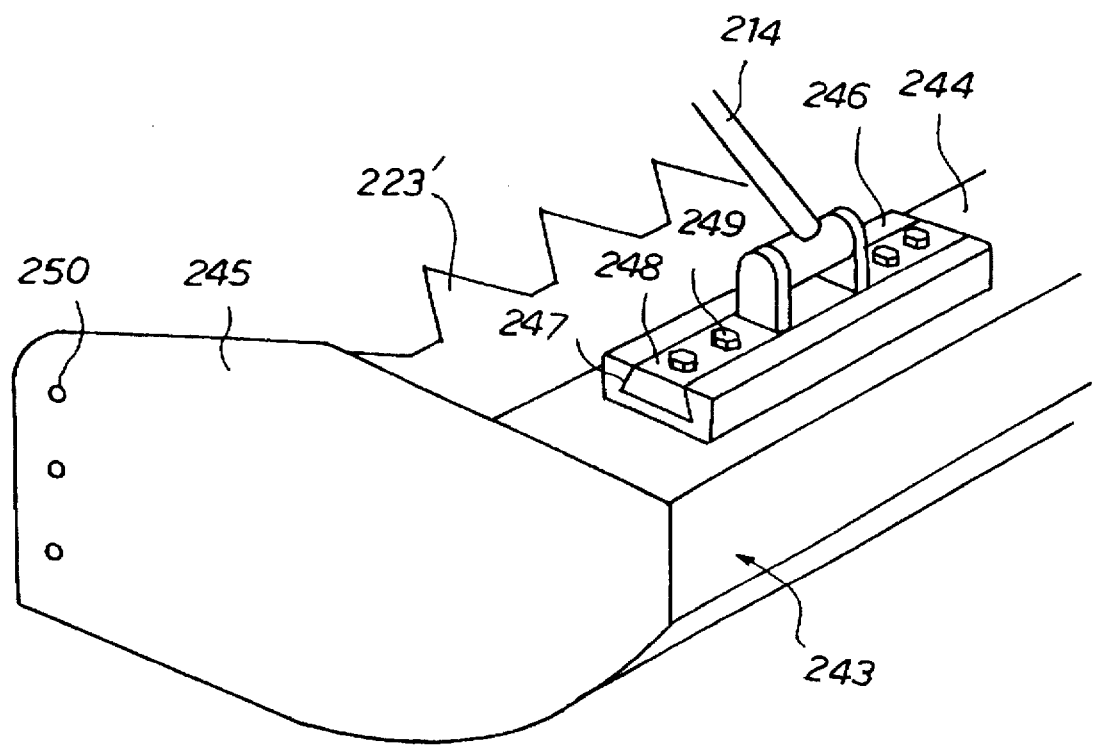
FIG. 18 illustrates a fragmentary view of a major part of a modified transplant apparatus.

One modification of the second embodiment will be described with reference to FIG. 18. The above-described second embodiment is designed to suit a relatively large tree. If the target plant is a small tree or bush, the transplant apparatus may have a simplified structure. Referring to FIG. 18, a pair of buckets 243 (left one is only illustrated) is removably connected to the link bars 214 and 215 and the hydraulic cylinder 217 (link bar 214 is only illustrated: see FIG. 7). Each bucket 243 has a mounting plate 244 and front and rear end plates 245 (front plate is only shown). The mounting plate 244 extends in the longitudinal direction of the transplant apparatus and connects the front and rear end plates 245 with each other. The front and rear end plates 245 extends from the front and rear ends of the mounting plate 244 at right angles in the width direction of the transplant apparatus. The bucket 243 also has a keyway member 246 elongated in the longitudinal direction of the transplant apparatus. This member 246 has a groove or slot 247 extending the length of the member 246. This slot 247 is trapezoid in cross section. A key 248 having an almost same configuration as the slot 247 is slidably fitted in the slot 247. The link bar 214 is pivotably connected with the key 248. Before the digging operation, the key 248 is slid into the key slot 247 and fixed on the member 246 by a plurality of bolts 249, so that the key 248 does not slide off the receiving member 246. A plurality of female threaded openings 250 is formed in the end plates 245 along a free edge of the end plate. These openings 250 would correspond to those 231 formed in the second bucket 208a shown in FIG. 10. A plurality of claws 223' is formed along a scooping edge of the bucket 243.

The right and left buckets 243 are moved to the closed positions (see FIG. 8) to scoop a tree. After scooping, the right and left buckets 243 are coupled by a plate (not shown) and bolts (not shown) screwed into the female threads 250 like the illustrated second embodiment (see FIG. 16). Then, the buckets holding the tree are placed on a sheet which is spread on a bed of a pick-up truck, for example. After unloading, the bolts 249 are untightened so that the key 248 becomes slidable relative to the key slot 247 upon a force exerted in its longitudinal direction. As the pick-up truck moves relative to the transplant apparatus, such a longitudinal force is exerted. Accordingly the buckets 243 together with the tree remain on the bed of the truck, and the transplant apparatus except the buckets 243 is separated from the truck. This modification has the same advantages as the second embodiment illustrated in FIGS. 6 to 17.

It should be noted that a pair of buckets is employed in the foregoing. However, only one bucket or more than two may be employed. Further, the shape and structure of the bucket may be varied according to a particular application such as a shape of a target tree or its root.

THIRD EMBODIMENT

Figure 19:
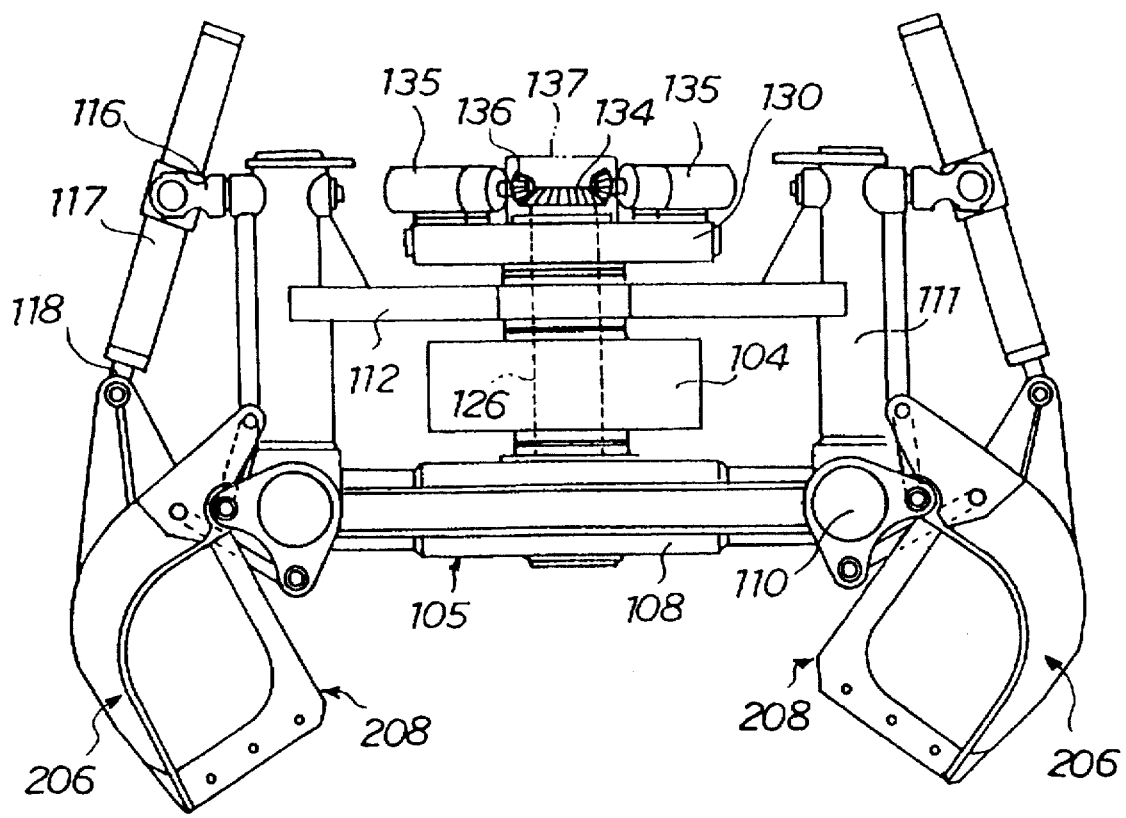
FIG. 19 depicts a front view of a transplant apparatus according to a third embodiment of the present invention.

Referring to FIG. 19, illustrated is a transplant apparatus which is constructed by combining the transplant apparatuses of the first and second embodiments. In this illustration, parts mutual to or derived from the foregoing embodiments are assigned the same reference numerals and description thereof is omitted.

As depicted, the buckets 106 of the first embodiment are replaced with the first and second buckets 206 and 208 of the second embodiment. This transplant apparatus has both the advantages of the first and second embodiments.

Specifically, the main frame 105 is rotatable about the vertical shaft 126 so that it is possible to turn the tree into an arbitrary direction and the second bucket 208 is removable from the first bucket 206 or the transplant apparatus so that transportation of the tree is carried out by a separate transferring device (e.g. a truck) and digging of another tree can be performed during transportation of the just dug tree. The tree may be turned before being unloaded onto a truck such that positions and directions of branches of the tree and/or a direction of a trunk is determined optimumly. This prevents breakage of the branches during transportation and maximizes the number of trees transported by a single truck.

What is claimed is:

1. An apparatus for digging and transplanting a plant from one place to another comprising:

a main arm;

an intermediate frame extending from the main arm, said intermediate frame having one end pivotally connected to said main for allowing swinging of said intermediate frame about a pivotal connection axis;

first drive means for swinging the intermediate frame up and down in a vertical plane about said pivotal connection axis;

a main frame mounted to the intermediate frame, the main frame being lifted up and down upon up and down swinging movements of the intermediate frame;

connection means provided between the intermediate frame and the main frame, said connection means allowing the main frame to be rotatable on the intermediate frame about a second axis transverse to said intermediate frame pivotal connection axis independently from the swinging movement of the intermediate frame, said second axis swung between a vertical to a horizontal position by swinging of said intermediate frame;

a first bucket supported on the main frame for digging the plant from the ground; and second drive means for rotating the main frame together with the first bucket about the connection means second axis.

2. The apparatus of claim 1 wherein the first bucket has a lower half semi-circular cross section and is offset from said frame by said connection means so as to be unobstructed from above and includes a pair of first bucket elements, each first bucket element having a quadrant cross section.

3. The apparatus of claim 1 wherein the second drive means includes mating bevel gears.

4. The apparatus of claim 2 further including a second bucket detachably mounted nested within the first bucket to cover an inner surface of the first bucket.

5. The apparatus of claim 4 wherein the first bucket includes a pair of first bucket elements and the second bucket includes a pair of second bucket elements detachably placed over the pair of first bucket elements respectively.

6. The apparatus of claim 1 wherein the main frame is able to be rotated about 180 degrees by said second drive means and said intermediate frame swung 90 degrees in the vertical plane by said first drive means.

7. A method of digging and transplanting a plant from one place to another using a transplant apparatus comprising the steps of:

providing an arm which extends from the transplant apparatus;

providing a frame mounted on the arm;

providing connection means between the arm and the frame;

providing first drive means for lifting the arm up and down together with the frame;

providing a first bucket supported by the frame for digging the plant from the ground;

providing second drive means for causing the frame together with the first bucket to rotate about the connection means in horizontal and vertical planes relative to the ground and independently from the arm;

rotating the frame and first bucket about the connection means in the horizontal or vertical plane while lifting the arm up or down to allow the first bucket to approach the plant;

digging the plant by the first bucket; and, rotating the frame and first bucket together with the plant about the connection means in the horizontal or vertical plane while lifting the arm up and down to carry the plant to a desired place.

8. The method of claim 7 further including the steps of:

nesting a second bucket into the first bucket to cover an inner surface of the first bucket after the step of providing the first bucket, thereby forming a single bucket unit;

rotating the single bucket unit about the connection means in the horizontal or vertical plane while lifting the arm up or down to allow the single bucket unit to approach the plant;

digging the plant by the single bucket unit;

rotating the single bucket unit together with the plant about the connection means in the horizontal or vertical plane while lifting the arm up and down to carry the plant to a desired place; and, removing the second bucket from the first bucket and landing the second bucket together with the plant while maintaining the first bucket on the frame.

9. The method of claim 7 further including the step of holding the first bucket and plant in an upright posture respectively after the digging step and before transportation to the desired place, and wherein the step of rotating the frame and first bucket together with the plant about the connection means in the horizontal and/or vertical plane while lifting the arm up and down to carry the plant to a desired place includes rotating the frame in the vertical plane so that the plant falls from the upright posture to a horizontally lying posture.

10. The method of claim 9 wherein the step of rotating the frame in the vertical plane so that the plant falls from the upright posture to a horizontally lying posture is carried out in such a manner that an operator of the apparatus can see the falling plant while the operator is driving the apparatus.

11. An apparatus for digging and transplanting a plant from one place to another comprising:

a main arm;

an intermediate frame extending from the main arm;

first drive means for moving the intermediate frame up and down about a pivotal connection to said main arm;

a main frame supported by the intermediate frame;

a bucket assembly supported by the frame for digging the plant from the ground, the bucket assembly including a first bucket and a second bucket nested within the first bucket; and, separation means for separating the first bucket from the second bucket after digging the plant so that the plant is held by the second bucket and the first bucket remains on the main frame.

12. The apparatus of claim 11 wherein said separation means includes a bolt to connect the second bucket to the first bucket.

13. The apparatus of claim 11 further including means for aligning the second bucket with the first bucket.

14. The apparatus of claim 13 wherein the aligning means includes a recess or cutout portion formed in the first bucket and a mating projection formed on the second bucket or vice versa.

15. The apparatus of claim 11 further including:

connection means provided between the intermediate frame and the main frame, the main frame being lifted up and down upon upward and downward movements of the intermediate frame; and, second drive means for causing the main frame to rotate about the connection means and independently from the intermediate frame.

16. The apparatus of claim 11 wherein the bucket assembly has a lower half semi-circular cross section having substantially nothing above it.

17. The apparatus of claim 11 wherein the first bucket includes a pair of first bucket elements end the second bucket includes a pair of second bucket elements stacked onto the pair of first bucket elements, respectively.

18. The apparatus of claim 15 wherein the second drive means includes mating bevel gears.

19. A method of digging and transplanting a plant from one place to another using a transplant apparatus comprising the steps of:

providing an arm which extends from the transplant apparatus;

providing a frame mounted on the arm;

providing a bucket assembly supported by the frame for digging the plant from the ground, the bucket assembly including a first bucket and a second bucket piled up on the first bucket;

providing first drive means for lifting the arm up and down together with the frame;

digging the plant by the bucket assembly;

separating the second bucket from the first bucket; and, loading the second bucket which holds the plant, on another vehicle for transportation to another place while maintaining the first bucket on the frame.

20. The method of claim 19 further including the steps of:

providing, before the digging step, connection means between the arm and the frame;

providing, before the digging step, second drive means for causing the frame to rotate about the connection means in horizontal and vertical planes relative to the ground the independently from the arm; and, rotating the bucket assembly together with the plant in the vertical plane while carrying the plant in the bucket.

21. The method of claim 20 further including the step of holding the bucket assembly and plant in an upright posture respectively after the digging step, and wherein the step of rotating the bucket assembly together with the plant about the connection means in the horizontal or vertical plane while carrying the plant includes rotating the frame in the vertical plane so that the plant falls from the upright posture to a horizontally lying posture.

22. The method of claim 21 wherein the step of rotating the frame in the vertical plane so that the plant falls from the upright posture to a horizontally lying posture is carried out in such a manner that an operator of the apparatus can see the falling plant while the operator is driving the apparatus.

* * * * *